(12) United States Patent
Albert et al.

(10) Patent No.: US 7,893,354 B2
(45) Date of Patent: Feb. 22, 2011

(54) CABLE HARNESS, MORE SPECIFICALLY A HIGH-VOLTAGE CABLE HARNESS FOR A MOTOR VEHICLE, AS WELL AS A DEVICE FOR LEADING-THROUGH AN ELECTRIC CABLE AND FOR CONNECTING A SHIELD OF THE CABLE

(75) Inventors: Volker Albert, Dettelbach (DE); Taoufik Ajmi, Albertshofen (DE)

(73) Assignee: Leoni Bordnetz-Systeme GmbH, Nuremberg (DE)

( * ) Notice: Subject to any disclaimer, the term of this patent is extended or adjusted under 35 U.S.C. 154(b) by 286 days.

(21) Appl. No.: 12/261,251

(22) Filed: Oct. 30, 2008

(65) Prior Publication Data
US 2009/0133925 A1 May 28, 2009

(30) Foreign Application Priority Data
Oct. 30, 2007 (DE) .................. 10 2007 051 836

(51) Int. Cl.
*H02G 3/04* (2006.01)
(52) U.S. Cl. ............... 174/72 A; 174/74 A; 174/85; 174/91; 439/211
(58) Field of Classification Search ........... 174/72 A, 174/68.3, 135, 74 A, 85, 91; 439/211, 584
See application file for complete search history.

(56) References Cited

U.S. PATENT DOCUMENTS

| | | | |
|---|---|---|---|
| 3,142,721 A | 7/1964 | Long | |
| 6,261,108 B1 | 7/2001 | Kanagawa et al. | |
| 6,419,521 B2 * | 7/2002 | Kanagawa et al. | 439/582 |
| 6,893,273 B2 | 5/2005 | Sato et al. | |
| 7,074,081 B2 * | 7/2006 | Hsia | 439/584 |
| 7,119,279 B2 * | 10/2006 | Niehaus et al. | 174/72 A |
| 7,172,042 B2 | 2/2007 | Yamaguchi et al. | |
| 2005/0162015 A1 | 7/2005 | Yamaguchi et al. | |

FOREIGN PATENT DOCUMENTS

| | | |
|---|---|---|
| DE | 9413938 U1 | 11/1994 |
| DE | 10349583 A1 | 5/2004 |
| EP | 1045476 A2 | 10/2000 |
| EP | 1440834 A1 | 7/2004 |

OTHER PUBLICATIONS

German Office Action dated Sep. 10, 2008.
European Search Report dated Mar. 19, 2009.

* cited by examiner

*Primary Examiner*—Dhiru R Patel
(74) *Attorney, Agent, or Firm*—Laurence A. Greenberg; Werner H. Stemer; Ralph E. Locher (57) ABSTRACT

A cable harness, more specifically a high-voltage cable harness for a motor vehicle, is provided. The cable harness has at least one electric cable, which includes an electric line and a shield that surrounds the line, as well as a device for leading-through and for connecting the shield of the cable. The device includes a lead-through element, through which a cable end is guided, as well as an under-sleeve. The under-sleeve includes a shaft and a head that is widened compared to the shaft. The under-sleeve with the shaft is inserted between the electric line and the shield as well as being retained by use of the head at the lead-through element.

33 Claims, 5 Drawing Sheets

CABLE HARNESS, MORE SPECIFICALLY A HIGH-VOLTAGE CABLE HARNESS FOR A MOTOR VEHICLE, AS WELL AS A DEVICE FOR LEADING-THROUGH AN ELECTRIC CABLE AND FOR CONNECTING A SHIELD OF THE CABLE

CROSS-REFERENCE TO RELATED APPLICATION

This application claims the priority, under 35 U.S.C. §119, of German application DE 10 2007 051 836.8, filed Oct. 30, 2007; the prior application is herewith incorporated by reference in its entirety.

BACKGROUND OF THE INVENTION

Field of the Invention

The invention relates to a cable harness, more specifically a high-voltage cable harness for a motor vehicle, as well as to a device for leading-through an electric cable and for connecting a shield of the cable.

Where an electric cable has a shield, on installation in the area the current-carrying electric line is electrically connected, the shield is also electrically connected separately from the line in order, for example, to connect the shield to the frame or ground potential. The shield contains, for example, a wire braid that is disposed around the line.

In motor vehicles, in the case of electric or hybrid vehicles with an electric drive motor, shielded, high-voltage cable harnesses are used for supplying the power to the drive motors and other units for driving the vehicle. The cable harnesses, in this case, are routed between wet and dry regions and care must be taken to provide reliable sealing at the transition between the regions. The multicore cable harness, that is to say a cable harness with a plurality of electric lines surrounded by a shield, is also connected to a so-called power electronic box (PEB) in this manner for instance. To this end, the lines have to be routed through the wall of the box and at the same time the shield has to be connected, that is electrically connected. This occurs, for example, through a connection to the wall of the box.

SUMMARY OF THE INVENTION

It is the object of the invention to provide a cable harness, more specifically a high-voltage cable harness for a motor vehicle, with as assembly-friendly a shield connection as possible. Another object of the invention is to provide a device for leading-through and connecting the shield, the device allowing for simple assembly.

The first-mentioned object is achieved according to the invention by a cable harness, more specifically a high-voltage cable harness for a motor vehicle. The cable harness has at least one cable, which includes an electric line and a shield that surrounds the line, as well as a device for leading-through and for connecting the shield of the cable. The device includes a lead-through element, through which the cable end is guided, as well as an under-sleeve, and the under-sleeve includes a shaft and a head that is widened compared to the shaft and the under-sleeve with the shaft is inserted between the electric line and the shield, and is retained by the head at the lead-through element.

The electric line of the cable includes an outer insulation sleeve. The shield of the cable, which is provided, for example, in the form of a wire braid, surrounds the insulated electric line. The shield, in its turn, is surrounded by a cable insulation sleeve.

To connect the shield of the cable, the shaft of the under-sleeve is simply pushed under the shield such that it is situated between the electric line and the shield. The thickened head of the under-sleeve, which extends, for example, similarly to the head of a nail, transversely relative to the shaft, projects more especially radially out of the "layered structure" of the cable such that it electrically connects the lead-through element. Therefore the shield of the cable is connected to the lead-through element via the head of the under-sleeve.

Due to the provision of the under-sleeve, expenditure required for connecting the shield of the cable, in particular, is very low as, for example, there is no need for screw-type and/or clamp-type connections that are costly to perform.

In order to obtain a good connection of the shield of the cable, shield connection in short, the under-sleeve is produced from a material with a high degree of electric conductivity, for example a metal.

The lead-through element is, for example, a plate-shaped element and is disposed for the shield connection of the cable in an opening in a housing wall or on a body part of a motor vehicle.

The under-sleeve preferably engages with the head in a form-fitting manner in a lead-through opening of the lead-through element. The head, therefore, is not retained from the outside on the lead-through element but is rather introduced completely or partially into the lead-through opening and is retained in the opening in a form-fitting manner. To this end, the shape of the head and that of the lead-through opening are preferably complementarily developed in such a manner that they are, for example, configured one relative to the other in the manner of a plug and socket. As an alternative it is also possible, for example, for the head to have a resilient component that expands or spreads out when the head is introduced into the lead-through opening. All in all, it is possible in the embodiment to increase the contact region between the head and the lead-through element and consequently to improve the shield connection further.

In an advantageous embodiment, a clamping part is mounted on the cable from externally and clamps the shield against the inserted shaft. The clamping part is, for example, in the form of a terminal screw, which is applied from externally to the cable insulation sleeve, and "squeezes" the shield of the cable fixedly onto the shaft that is inserted below. Consequently, a good and at the same time slip-proof connection is produced between the shaft and the shield such that a reliable shield connection is guaranteed.

It is expedient for the clamping part to be a crimp barrel. The shield is electrically connected to the shaft of the under-sleeve by the crimp barrel. The term crimp barrel refers in this case to a cable receiving sleeve, which, for example, is compressively deformed by a crimping tool such that it surrounds the cable in a solid manner. A crimp barrel can be used as a clamping part as it is particularly cost-effective and simple to manipulate.

The head of the under-sleeve is preferably clamped between a securing element and the lead-through element. Therefore the head is retained in a slip-proof position at the lead-through element such that a reliable shield connection to the lead-through element is guaranteed. The securing element is preferably screwed or adhered against the lead-through element such that the head of the under-sleeve is clamped fixedly between the lead-through element and the securing element. The under-sleeve is preferably connected electrically at the same time via the securing element.

It is expedient for the securing element to be in the form of a securing plate. The securing plate is preferably screw-connected to the lead-through element. In this embodiment the securing element is especially economical in materials and consequently can be produced in a cost-effective manner.

In an advantageous embodiment, the securing element includes at least one half-shell-like cable routing arm. The cable, therefore, does not have to be "threaded" through a cable opening of the securing element. Rathermore, the securing element is introduced to the cable in a lateral manner. This makes it possible to assemble the securing element in a very simple manner.

An anti-twist device is preferably configured at the head of the under-sleeve. The anti-twist device is preferably in the form of a pin, which engages in a receiving opening of the securing element. The pin extends more especially longitudinally relative to the shaft of the under-sleeve and is disposed on the head. The receiving opening of the securing element, in which the pin engages, is, for example, in the form of a hole or an open notch. The anti-twist device, in this case, is realized using very simple, cost-effective measures. As an alternative to the pin, the head is, for example, configured with many sides in the manner of a polygonal screw and is inserted into a polygonal lead-through opening that is configured in a complementary manner.

In an advantageous development the lead-through element is in the form of a type of bushing for arrangement in an opening in a housing wall. Consequently it is possible in an advantageous manner to dispose the lead-through element in a housing wall of an arbitrary electric device or in another wall lead-through and consequently, more especially, to connect the shield of the cable to the housing suitable for this. It is expedient for the lead-through element to include a circumferential seal to form a sealing device. Consequently, it is guaranteed, for example, that no moisture or unwanted particles can penetrate the housing of the electric device.

A sealing device is preferably provided in the lead-through element for longitudinal waterproof sealing of the cable. This guarantees, in particular, that no moisture can pass via the lead-through opening to the shield that is frequently partially unprotected in the region of the pushing-under.

To this end the sealing device preferably includes a seal that extends around the head of the under-sleeve. Therefore a sealing of a transition joint between the end of the lead-through element on the head side and the under-sleeve is achieved in a simple manner. The end of the lead-through element on the head side refers to the end against which the head of the under-sleeve abuts.

For sealing a transition joint between the end of the lead-through element on the shaft side and the inserted shaft, more especially between the lead-through element and the clamping part, the sealing device is preferably provided in the aforementioned transition joint in the form of a sealing compound. The end on the shaft side refers in this context to the end of the lead-through element facing the shaft of the under-sleeve. The sealing compound, in this case, is preferably provided as a casting compound produced from a suitable sealing material, and is provided, for example, between the crimp barrel and the lead-through element. A sealing compound of this type is advantageously smeared into the transition joint such that the joint is, for example, reliably sealed against penetrating moisture.

In another advantageous development, the sealing device is sleeve-like and is pulled from externally over the end of the lead-through element on the shaft side and over a cable region that adjoins the end. The sleeve-like sealing device is, for example, in the form of a so-called heat-shrinkable sleeve. Such a heat-shrinkable sleeve is a plastics material sleeve, which contracts strongly under the effect of heat. The heat-shrinkable sleeve is produced, for example, from an ethylene-propylene-diene-terpolymer (EPDM) rubber. Therefore the end of the lead-through element on the shaft side and the cable are connected, as it were, in the manner of a "foil fusion" such that the transition joint is sealed off from the outside. As an alternative to this, the sleeve-like sealing device is in the form of a bushing-like extrusion coating made from a suitable sealing compound.

The aforementioned variants for longitudinal waterproof sealing of the cable in the lead-through element, that-is-to-say more especially the seal that extends around the head of the under-sleeve, the sealing compound and the sleeve-like sealing device can be provided, in this case, both in an alternative and a complementary manner. It is frequently useful, in this case, to combine the circumferential seal of the head with one of the aforementioned alternative sealing device. More especially where a sealing device uses a heat-shrinkable sleeve, it is possible to do without using the seal that extends round the head of the under-sleeve.

The second object is achieved according to the invention by a device for leading-through and connecting a shield of an electric cable, the device for including a lead-through element with a lead-through opening for the cable, as well as an under-sleeve, wherein the under-sleeve includes a shaft and a head that is widened compared to the shaft and is retained at the lead-through element by the head and wherein the shaft is designed for insertion under the shield of the cable.

Device for leading-through and connecting a shield of an electric cable, the device including a lead-through element with a lead-through opening for a cable, as well as an under-sleeve that includes a shaft and a head that is widened relative to the shaft, the under-sleeve being retained at the lead-through element by the head and the shaft being configured for insertion under a shield of the cable.

The advantages outlined for the cable harness can be transferred analogously in this case to the device.

The lead-through element has a lead-through opening, through which the cable can be led. To this end, within a fit tolerance, the lead-through opening is preferably larger than the diameter of the cable with the crimp barrel fitted such that the cable is reliably guided therein. The diameter of the cable is produced more especially from its frequently concentric "layered structure", in which the more especially insulated electric line is surrounded in a sleeve-like manner by a shield, for example a wire braid, and the shield is conventionally surrounded, in turn, by a cable insulation sleeve.

The under-sleeve is configured to form a connection between the shield of the cable and the lead-through element. To this end, the under-sleeve includes a shaft, which extends more especially in a longitudinal direction and has a shaft opening with a preferably round cross-sectional area.

For the insertion of the shaft under the shield of the cable the inside diameter of the more especially round shaft opening is just slightly larger than the outside diameter of the electric line of the cable, for example a high-voltage cable, and the outside diameter of the shaft is sufficiently small for insertion under the shield. All in all, therefore, the shaft is provided such that, within a fit tolerance, it can be pushed between the shield and the electric line of the cable.

The head of the under-sleeve extends more especially transversely relative to the shaft of the under-sleeve, and extends around the shaft for example in a ring-shaped manner, for example in the manner of the head of a nail. The radial extension of the head, in this case, is greater than the cable diameter, such that the head, with the under-sleeve inserted, protrudes more especially radially from the "layered structure" of the cable.

The radial extension of the head, in this case, is more especially sufficient in order to prevent the head being passed through the lead-through opening completely. The achievement here is that the head, with the under-sleeve in the inserted state, is supported more especially at an edge of the lead-through opening of the lead-through element.

The lead-through opening is preferably provided to receive the head in a form-fitting manner. To this end the lead-through opening, for example, includes a step-shaped narrowing region. In this case, the radial extension of the head is smaller than the narrowing region, such that the head can be introduced into the lead-through opening but remains "suspended", for example, at the edge of a step of the narrowing region of the lead-through opening.

As an alternative, it can be provided that the head is retained from externally at the lead-through opening. In this case, the diameter of the head is larger than the lead-through opening, such that it cannot be introduced into the lead-through opening but, from externally, contacts the edge of the lead-through opening.

Other features which are considered as characteristic for the invention are set forth in the appended claims.

Although the invention is illustrated and described herein as embodied in a cable harness, more especially a high-voltage cable harness for a motor vehicle, as well as to a device for leading-through an electric cable and for connecting a shield of the cable, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
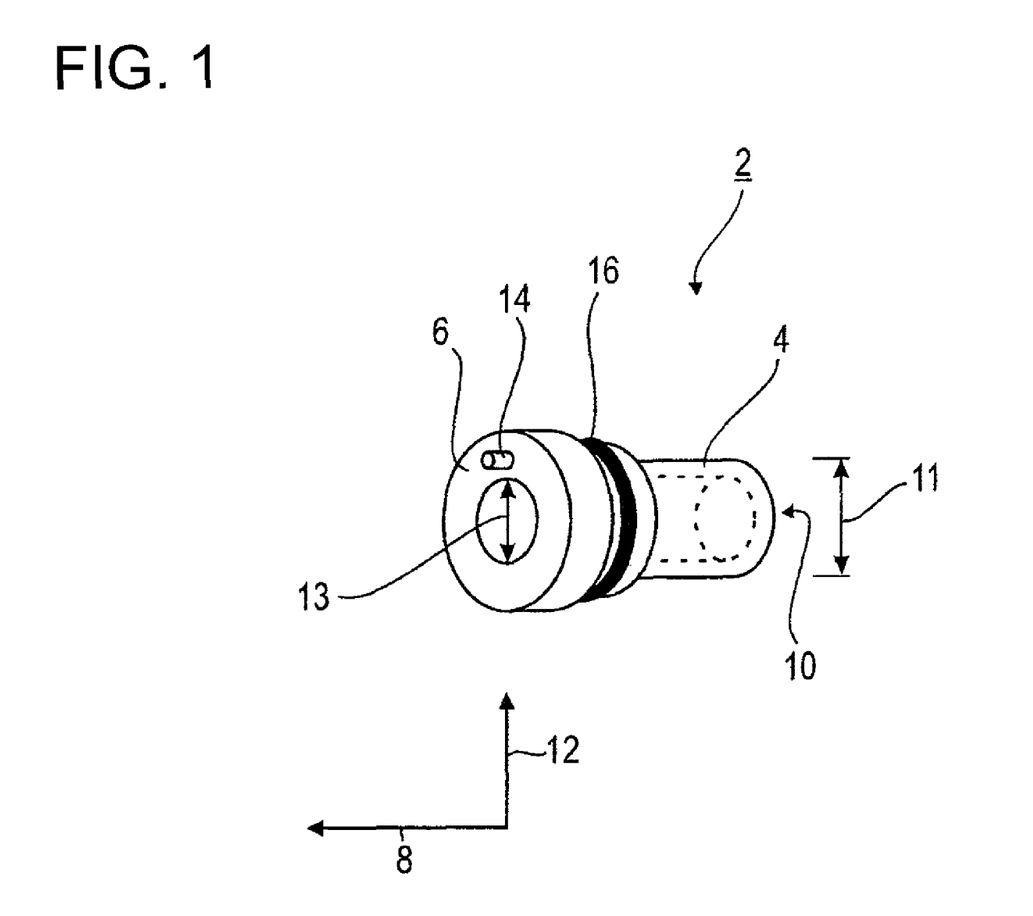
FIG. 1 is a diagrammatic, perspective view of an under-sleeve according to the invention.

Referring now to the figures of the drawing in detail and first, particularly, to FIG. 1 thereof, there is shown an under-sleeve 2 with a shaft 4 and a head 6.

Figure 2:
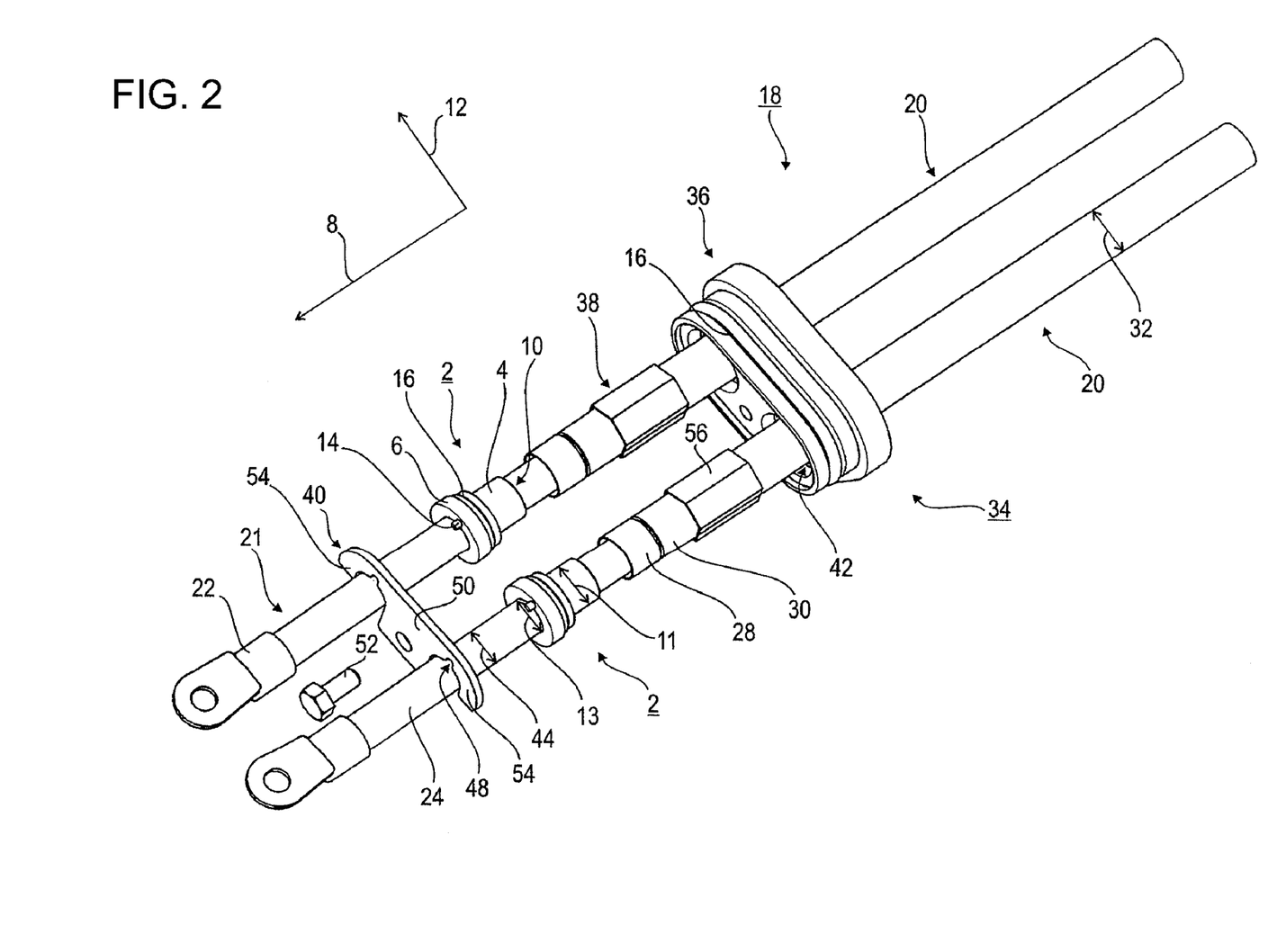
FIG. 2 is a diagrammatic, exploded perspective view of a cable harness in a pre-assembled state.
Figure 3:
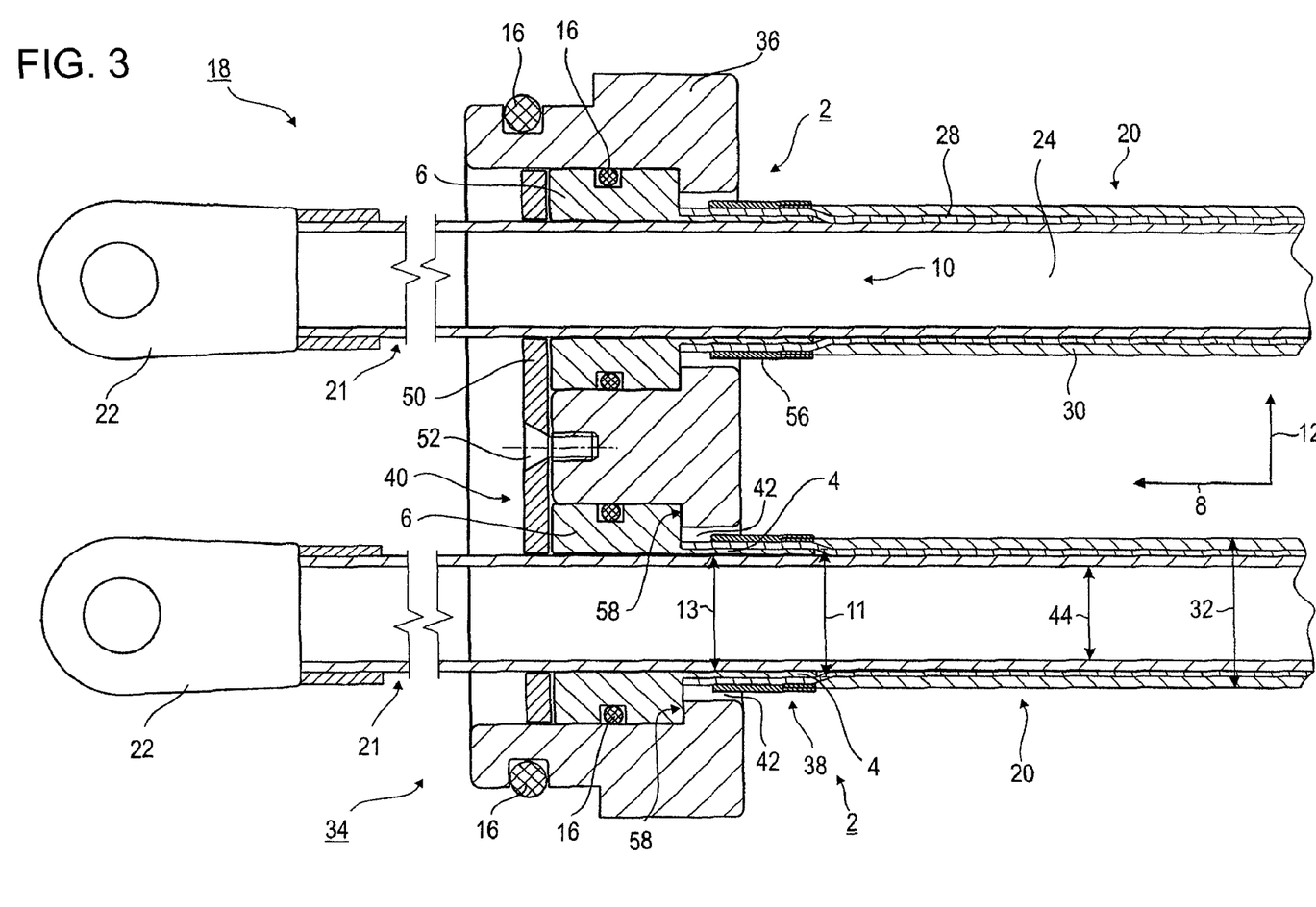
FIG. 3 is a cross-section view through the cable harness in an assembled state.

The shaft 4 extends in a longitudinal direction 8 and has a round shaft opening 10. The ring-shaped head 6 of the under-sleeve 2 is thickened compared to the shaft 4 such that it exceeds an outside diameter 11 of the shaft 4 in a transverse direction 12. As can be seen in FIGS. 2 and 3, the shaft 4 is pushed over an electric line 24 of a cable 20 to form a shield connection between the cable 20 and the inside diameter 13 of the shaft opening 10.

The head 6 of the under-sleeve 2 includes a pin 14, which extends in the longitudinal direction 8 and which is provided to form an anti-twist device of the under-sleeve 2 (see FIG. 2). The head 6 also includes a seal 16, which extends around the head 6 in a ring-shaped manner.

The cable harness 18, represented in FIG. 2, includes two cables 20, which, in this case, are provided as two high-voltage cables for a motor vehicle.

Each of the cable ends 21 of the two cables 20 that extend in the longitudinal direction 8 is provided with a cable lug 22 and is connectable via the cable lug 22, for example, to an electric motor or a battery. To this end, the cable lug 22 is attached to a conductor of the electric line 24 of the cable 20.

The representation clearly shows the "layered structure" of the cable 20, where the electric line 24, that is to say an electric conductor that is surrounded by insulation, is surrounded by a shield 28. The shield 28, which in this case is provided as a wire braid, is surrounded, in turn, by a cable insulation sleeve 30. The cable diameter 32, consequently, is determined by the concentric layered structure of the cable 20.

When the cable end 21 is introduced into a housing of an electric device, for example into the so-called Power Electronic Box, it is necessary to connect the shield 28 of the cable 20 to the housing wall, for example for grounding. To this end, the cable harness 18 includes a device 34 for connecting the shield and for leading-through a cable end 22.

The device 34 includes a lead-through element 36, and the under-sleeve 2 as well as a clamping part 38 and a securing element 40 for securing the under-sleeve 2.

The lead-through element 36 is configured in the form of a bushing for arrangement in an opening in a housing wall, such that it is easily insertable into a housing wall of an electric device. For reliable sealing, the lead-through element 36 includes a circumferential seal 16. For leading-through the two cable ends 21 of the cable harness 18, the lead-through element 36 has two lead-through openings 42. The size of the lead-through opening 42, in this case, is adapted substantially to the cable diameter 32 such that the cables are passed through in a sealed manner.

The under-sleeve 2 with its shaft 4 extending in the longitudinal direction 8 is pushed onto the insulated electric line 24. To this end, the shaft 4 of the under-sleeve 2 has the round shaft opening 10, the inside diameter 13 of which being slightly larger than an outside diameter 44 of the electric line 24. For insertion of the shaft 4 under the shield 28 of the cable 20, the outside diameter 11 is sufficiently small in order to push the shaft 4 of the under-sleeve 2 between the shield 28 and the electric line 24 of the cable 20.

The head 6 of the under-sleeve 2 is thickened compared to the shaft 4 and surrounds the shaft in a ring-shaped manner. The radial extension of the head, in this case, is larger than the cable diameter 32. Therefore the head 6 protrudes, for example in the transverse direction 12, out of the "layered structure" of the cable 20. In the completely assembled state of the cable harness 18 (see FIG. 3), the under-sleeve 2 is introduced to the lead-through element 36 such that the head 6 rests in a form-fitting manner in the lead-through opening 42 of the lead-through element 36. Therefore the shield 28 of the cable 20 is connected to the lead-through element 36 by the head 6. The head 6 of the under-sleeve 2 also includes the seal 16, which extends around the head 6 in a ring-shaped manner.

In the assembled state of the cable harness 18 (see FIG. 3), the pin 14 of the head 6, for the anti-twist protection of the under-sleeve 2, engages in a receiving opening 48 of the securing element 40, the receiving opening being in the form of an open notch.

The securing element 40, in this case, is provided as a securing plate 50. In the assembled state of the cable harness 18 (see FIG. 3), the head 6 of the under-sleeve 2 is clamped between the securing plate 50 and the lead-through element 36. To this end, the securing plate 50, when viewed from the direction of the cable lug 22, is screw-connected in front of the head 6 to the lead-through element 36 located behind the head 6 by a screw 52. Therefore a positioning of the head 6, slip-proof in the longitudinal direction 8, in the lead-through opening 42 of the lead-through element 36 is guaranteed. In other words, the head 6 cannot slip out of the lead-through opening 42. In addition, the head 6 is retained in a twist-proof position, through the engaging of the pin 14, disposed at the end face of the head 6, in the notch-like receiving opening 48 of the securing plate 50. All in all, this guarantees a reliable shield connection between the cable 20 and the lead-through element 36.

In order to enable simple assembly of the securing plate 50, the securing plate has two half-shell-like cable routing arms 54. Consequently it is possible to place the anchor-shaped securing plate 50 simply onto the cable 20 of the cable harness 18 directly at the desired position and then to screw it to the lead-through element 36.

The device 2 also includes the clamping part 38, which is provided in the exemplified embodiment as a crimp barrel 56. The crimp barrel 56 is pushed onto the cable insulation sleeve 30 of the cable 20. In the assembled state of the cable harness 18, the crimp barrel 56 "squeezes" the shield 28 of the cable 20 onto the shaft 4 of the under-sleeve 2 inserted underneath. This realizes a very good electric connection between the shaft 4 and the shield 28 of the cable 20 such that a reliable shield connection can be guaranteed. At the same time, this provides strain relief for the line 24.

In the cross-sectional representation shown in FIG. 3, it is very clear how in the completely assembled state of the cable harness 18, the head 6 of the under-sleeve 2 rests in a form-fitting manner in the lead-through element 36 on an edge of the lead-through opening 42. Therefore the head 6 is connected to the lead-through element 36 over a large connecting region. Consequently, a large-area and consequently effective connection of the shield 28 of the cable 20 to the lead-through element 36 is achieved.

The shape of the head 6 and that of the lead-through opening 42 are more especially configured one relative to the other in the manner of a plug and socket. The lead-through opening 42, to this end, has in particular a step-shaped cross-section, such that the head 6, when introduced from the direction of the cable lug 22 into the lead-through opening 42, strikes a step 58 and cannot be completely pulled through the lead-through opening 42. The securing plate 50 is screw-connected to the lead-through element 36 from the side of the lead-through opening 42 situated opposite the step 58. All in all, the head 6 of the under-sleeve 2 is consequently connected in a slip-proof manner to the lead-through element 36 in the longitudinal direction 8.

It is also clearly recognizable in the cross-section how the shaft 4 of the under-sleeve 2 is pushed between the insulated electric line 24 and the shield 28 of the cable 20. The crimp barrel 56, applied to the cable 20 from externally, squeezes the shield 28 of the cable 20 onto the shaft 4 such that the said shaft has good contact to the shield 28 and is connected in a slip-proof manner.

Figure 4:
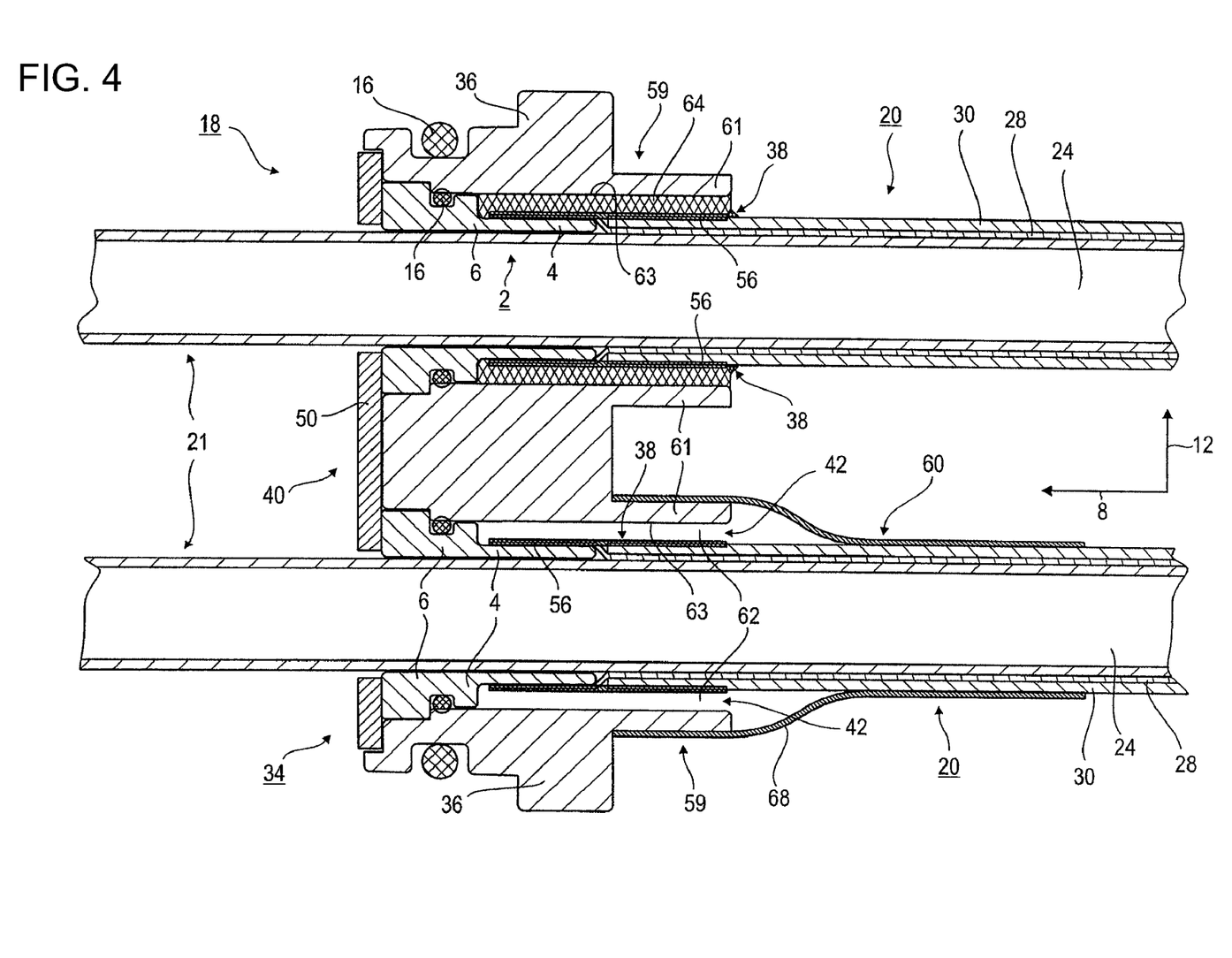
FIG. 4 is a diagrammatic, cross-sectional view through another cable harness in an assembled state.

FIG. 4 shows another embodiment variant of the cable harness 18 with two cables 20, as well as a device 34 for connecting the shield and leading-through the respective cable end 22. In this case too, the cable end 22 is passed through a lead-through opening 42 of the lead-through element 36. It is also clearly recognizable how the shaft 4 of the under-sleeve 2 is pushed between the insulated electric line 24 and the shield 28 of the cable 20. As also represented in FIG. 3, the clamping part 38, in the form of crimp barrel 56, squeezes the shield 28 of the cable 20 from externally onto the shaft 4. It is clearly visible in this diagram how the crimp barrel 56 is also applied from externally onto the cable insulation sleeve 30 of the cable 20, strain relief of the line 24 thereby being achieved in particular.

Just as in FIGS. 2 and 3, the lead-through element 36 is provided in the manner of a bushing for installation into an electric device. Contrary to the aforementioned representations, the lead-through opening 42 on the end 59 on the shaft side is surrounded by a circumferential sleeve-like collar 61. The end 59 of the lead-through element 36, in this case, refers to the end that is facing the shaft 4 of the under-sleeve 2.

As shown in FIGS. 2 and 3, the head 6 of the under-sleeve 2, as well as the lead-through element 36 is surrounded by a circumferential seal 16. In addition, the cable harness 18 shown in FIG. 4 includes a number of additional sealing devices 16, 60, 64, more especially also for longitudinal waterproof sealing of a transition joint 62. In the cable harness 18 shown in this case, a transition joint 62 is substantially defined by the crimp barrel 56, which is applied from externally onto the cable 20 and the shaft 4, as well as a wall 63 of the lead-through opening 42 of the lead-through element 36.

The transition joint 62 shown in the top half of the diagram is sealed by a sealing compound 64 made from a suitable sealing material. The sealing compound 64, to this end, is applied between the crimp barrel 56 and the end 59 of the lead-through element 36 on the shaft side. It can be clearly seen how the sealing compound 64 seals the transition joint 62. This guarantees, in particular, that no moisture can pass via the transition joint 62 to the shield 28 that is partially unprotected in the region of the pushing-under.

The sealing device 60, represented in the bottom half of the diagram, is sleeve-like and is provided in this case in the form of a heat-shrinkable sleeve 68. The heat-shrinkable sleeve 68 is pulled from externally over the end of the lead-through element 36 on the shaft side, in particular over its collar 61, and over the cable 20. Therefore the transition joint 62 is sealed off from the outside.

Figure 5:
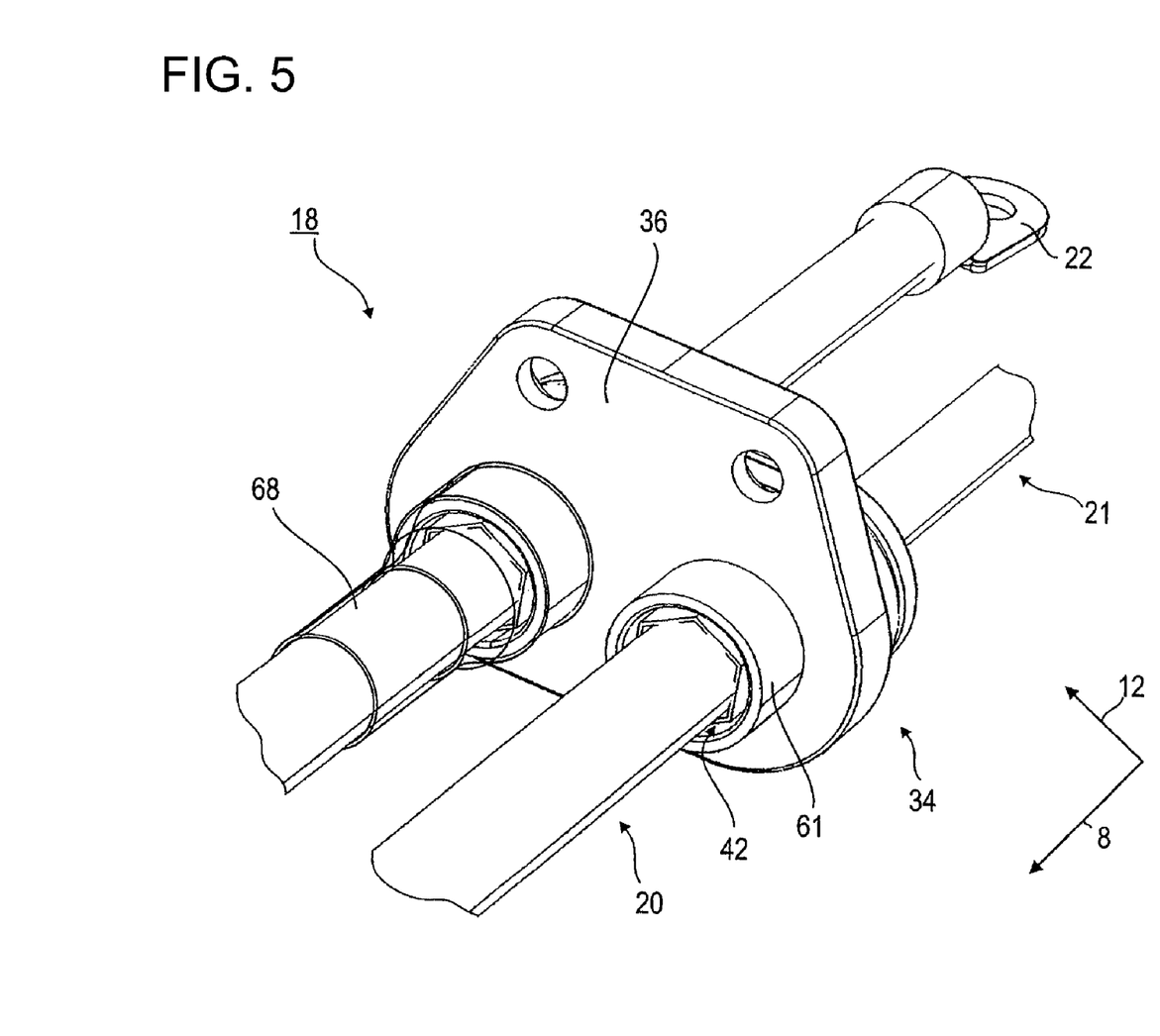
FIG. 5 is a diagrammatic, top perspective view of the cable harness shown in FIG. 4.

The cable harness 18 described in FIG. 4 is shown in a top view in FIG. 5. In this representation it is clearly recognizable how a collar 61 surrounds each of the two lead-through openings 42 of the lead-through element 36 in a sleeve-like manner. The cable 20 guided through the lead-through opening 42 is retained in a guided position by the collar 61. It is also clearly visible how the heat-shrinkable sleeve 68 is pulled over one of the two cables 20, as well as over the corresponding collar 61, and in a sealing manner seals off both the cable 20 and the collar 61. Therefore the lead-through opening 42 is sealed off from the outside such that, in particular, the shield connection is not impaired by penetrating moisture.

The invention claimed is:

1. A cable harness, comprising:
at least one electric cable having an electric line, a shield surrounding said electric line, and a cable end; and
a device for leading-through said electric cable and for connecting said shield of said electric cable, said device having a lead-through element, through which said cable end is guided, and an under-sleeve, said under-sleeve having a shaft and a head being widened compared to said shaft, said under-sleeve with said shaft disposed between said electric line and said shield and further retained by means of said head at said lead-through element.

2. The cable harness according to claim 1, wherein:
said lead-through element has a lead-through opening formed therein; and
said under-sleeve engages with said head in a form-fitting manner in said lead-through opening of said lead-through element.

3. The cable harness according to claim 1, further comprising a clamping part externally mounted on said electric cable and clamps said shield against said shaft.

4. The cable harness according to claim 3, wherein said clamping part is a crimp barrel.

5. The cable harness according to claim 3, further comprising a sealing device disposed in said lead-through element for longitudinal waterproof sealing of said electric cable.

6. The cable harness according to claim 5, wherein said sealing device has a seal that extends around said head of said under-sleeve.

7. The cable harness according to claim 6, wherein:
said lead-through element has an end on a shaft side and said end with said shaft define a transition joint therebetween; and
said sealing device is disposed in said transition joint between said end of said lead-through element on said shaft side and said shaft, in a form of a sealing compound.

8. The cable harness according to claim 5, wherein said sealing device is disposed between said lead-through element and said clamping part, in a form of a sealing compound.

9. The cable harness according to claim 5, wherein said sealing device is sleeve-like and is pulled from externally over an end of said lead-through element on said shaft and over a cable region that adjoins said end.

10. The cable harness according to claim 1, further comprising a securing element and said head of said under-sleeve is clamped between said securing element and said lead-through element.

11. The cable harness according to claim 10, wherein said securing element is a securing plate.

12. The cable harness according to claim 10, wherein said securing element includes at least one half-shell-like cable routing arm.

13. The cable harness according to claim 10, wherein said under-sleeve has an anti-twist device configured at said head of said under-sleeve.

14. The cable harness according to claim 13, wherein:
said securing element has a receiving opening formed therein; and
said anti-twist device is a pin which engages in said receiving opening of said securing element.

15. The cable harness according to claim 13, wherein said lead-through element is a type of bushing for arrangement in an opening in a housing wall.

16. The cable harness according to claim 1, wherein said lead-through element has a circumferential seal.

17. The cable harness according to claim 1, wherein the cable harness is a high-voltage cable harness for a motor vehicle.

18. A device for leading-through an electric cable and for connecting a shield of the electric cable, the device comprising:
a lead-through element having a lead-through opening formed therein for the electric cable and an under-sleeve, said under-sleeve having a shaft and a head being widened compared to said shaft and retained at said lead-through element by means of said head, and said shaft is configured for insertion under the shield of the electric cable.

19. The device according to claim 18, wherein said lead-through opening and said head are developed for a form-fitting receiving of said head.

20. The device according to claim 18, further comprising a clamping part for clamping said shaft in an inserted state.

21. The device according to claim 20, wherein said clamping part is a crimp barrel.

22. The device according to claim 20, further comprising a sealing device disposed in said lead-through element for longitudinal waterproof sealing of the electric cable.

23. The device according to claim 22, wherein said sealing device includes a seal that extends around said head of said under-sleeve.

24. The device according to claim 23, wherein said sealing device is sleeve-like and is pulled from externally over an end of said lead-through element on said shaft and over a cable region that adjoins said end.

25. The device according to claim 22, wherein said sealing device is disposed in a transition joint between an end of said lead-through element on a shaft side and said shaft, in a form of a sealing compound.

26. The device according to claim 22, wherein said sealing device is disposed between said lead-through element and said clamping part, in a form of a sealing compound.

27. The device according to claim 18, further comprising a securing element for securing said head on said lead-through element.

28. The device according to claim 27, wherein said securing element is a securing plate.

29. The device according to claim 27, wherein said securing element has at least one half-shell-like cable routing arm.

30. The device according to claim 29, wherein said under-sleeve has an anti-twist device at said head of said under-sleeve.

31. The device according to claim 30, wherein said anti-twist device is a pin and said securing element has a receiving opening formed therein for receiving said pin.

32. The device according to claim 18, wherein said lead-through element is a type of bushing for arrangement in an opening of a housing wall.

33. The device according to claim 18, wherein said lead-through element has a circumferential seal.

* * * * *